(12) United States Patent
Bose

(10) Patent No.: US 7,109,597 B1
(45) Date of Patent: Sep. 19, 2006

(54) ELECTRICAL ENERGY GENERATING SYSTEM

(76) Inventor: Phillip R. Bose, 2088 Ahneita Dr., Pleasant Hill, CA (US) 94523

(*) Notice: Subject to any disclaimer, the term of this patent is extended or adjusted under 35 U.S.C. 154(b) by 0 days.

(21) Appl. No.: 11/110,596

(22) Filed: Apr. 19, 2005

Related U.S. Application Data

(63) Continuation-in-part of application No. 10/290,648, filed on Nov. 12, 2002, now abandoned.

(51) Int. Cl.
- *F02B 63/04* (2006.01)
- *F03G 7/08* (2006.01)
- *F01K 15/00* (2006.01)
- *F02C 6/00* (2006.01)
- *F03B 13/00* (2006.01)

(52) U.S. Cl. .......... 290/43; 290/53; 290/1 R; 290/2

(58) Field of Classification Search .......... 290/43, 290/53, 1 R, 2
See application file for complete search history.

(56) References Cited

U.S. PATENT DOCUMENTS

| | | | |
|---|---|---|---|
| 1,980,873 A * | 11/1934 | Niederreither ............ | 204/266 |
| 2,524,826 A * | 10/1950 | Wolf ............ | 290/4 R |
| 2,532,096 A * | 11/1950 | Hartley ............ | 60/531 |
| 4,146,800 A | 3/1979 | Gregory et al. | |
| 4,206,396 A | 6/1980 | Marks | |
| 4,281,255 A * | 7/1981 | Sherman ............ | 290/1 R |
| 4,284,481 A | 8/1981 | Hascoe | |
| 4,324,983 A | 4/1982 | Humiston | |
| 4,719,158 A | 1/1988 | Salomon | |
| 5,512,787 A | 4/1996 | Dederick | |
| 5,942,806 A * | 8/1999 | Veliadis ............ | 290/1 R |
| 6,100,600 A | 8/2000 | Pflanz | |
| 6,160,318 A | 12/2000 | Komura | |
| 6,182,615 B1 | 2/2001 | Kershaw | |
| 6,225,705 B1 * | 5/2001 | Nakamats ............ | 290/43 |
| 6,313,545 B1 | 11/2001 | Finley et al. | |
| 6,335,572 B1 | 1/2002 | Uno et al. | |
| 6,856,037 B1 * | 2/2005 | Yazawa et al. ............ | 290/43 |
| 6,914,343 B1 * | 7/2005 | Hiller et al. ............ | 290/43 |
| 2005/0167987 A1 * | 8/2005 | Perlo et al. ............ | 290/1 R |

FOREIGN PATENT DOCUMENTS

JP 352071613 A * 6/1977

* cited by examiner

Primary Examiner—Julio C. Gonzalez
(74) Attorney, Agent, or Firm—Thomas R. Lampe

(57) ABSTRACT

A system for generating electrical energy includes heating a liquid to produce a vapor. The vapor is transported past electron collecting structure which collects electrons from the vapor. Electrons are added to the vapor prior to the vapor reaching the electron collecting structure by an antenna/diode combination.

7 Claims, 2 Drawing Sheets

ELECTRICAL ENERGY GENERATING SYSTEM

This application is a continuation-in-part application based on U.S. patent application Ser. No. 10/290,648, filed Nov. 12, 2002 now abandoned.

TECHNICAL FIELD

This invention relates to the generation of electricity and more particularly to an apparatus and a method for generating electricity.

BACKGROUND OF THE INVENTION

The generation of electricity on a large scale typically and primarily has been accomplished by two well known methods—the conversion of mechanical energy into electrical energy through the agency of electromagnetic induction, i.e., by a dynamo, or by a chemical reaction of either acids or salts on different metallic electrodes, as in a battery or dry cell.

Thermometry is another, but relatively small-scale, method which uses the fusion of two similar metallic wires to form a junction that produces an electrical current in proportion to the heat sensed by this junction. Also, photovoltaic cells or solar cells produce electrical energy by the action of light on the cells. The approach of utilizing fuel cells employs the combination of hydrogen and oxygen to produce electricity. Piezoelectric cells are known and depend on pressure on crystals to emit energy. Other approaches for producing electrical energy are continually being discovered through research.

U.S. Pat. No. 4,206,396 describes a method of using dispersed by wind aerosols of electrically charged water droplets and collecting these droplets on metallic grids thus generating a large amount of electric power at a high voltage output.

U.S. Pat. No. 4,284,481 discloses a tethered, shaped air foil containing a lighter-than-air gas to which wind turbines are attached for the production of electrical energy. The air foil is held at an angle of attack to the wind direction so that maximum electrical output is obtained. An anchoring cable consisting of a power collection line and operating control lines simplify the tethering.

U.S. Pat. No. 4,719,158 discloses a method of exploiting ocean wave motion to produce electrical energy using a "U" shaped tube containing the combination of a liquid and hydrogen gas. The rocking motion of the "U" tube causes a gas pressure differential to develop which moves oppositely charged particles onto parallel electrocatalytic electrodes in a closed system. These parallel electrodes collect the electric power for external use.

U.S. Pat. No. 6,335,572 describes a thermoelectric device for generating electrical power from combustion. The temperature difference between the high temperature side and the low temperature side of a thermoelectric converter produces sufficient D.C. electrical energy after powering its internal system for practical usage.

The following patents also disclose various known electricity generation systems: U.S. Pat. No. 4,146,800, U.S. Pat. No. 4,324,983, U.S. Pat. No. 5,512,787, U.S. Pat. No. 6,100,600, U.S. Pat. No. 6,160,318, U.S. Pat. No. 6,182,615, and U.S. Pat. No. 6,313,545.

The known prior art, as exemplified by the patents noted above, does not disclose or suggest the apparatus and method disclosed and claimed herein.

DISCLOSURE OF INVENTION

In accordance with the teachings of the present invention, electrical generation is accomplished by condensing a vapor back to a liquid in a closed system.

The apparatus for generating electrical energy includes a container containing a liquid heated to a sufficient degree to produce a vapor, the container including a passageway for transporting the vapor.

Electron supply structure is operatively associated with the container for adding electrons to electrons pre-existing in the vapor during transport thereof.

Electron collecting structure downstream from the electron supply structure is employed to collect electrons from the vapor during transport thereof in the passageway after electrons have been added to the vapor during transport thereof.

The electron supply structure includes an electron feeding electrode, an antenna receiving ambient electrical energy and a diode disposed between the electron feeding electrode and the antenna.

The method of the system for generating electrical energy includes the step of producing vapor from heated liquid. The vapor is transported in a passageway.

During transport of the vapor in the passageway, at a first location electrons are added to electrons pre-existing in the vapor.

After the step of adding the electrons thereto, the vapor is transported to a second location. At the second location electrons are collected from the vapor.

Other features, advantages and objects of the present invention will become apparent with reference to the following description and accompanying drawings.

MODES FOR CARRYING OUT THE INVENTION

Figure 1:
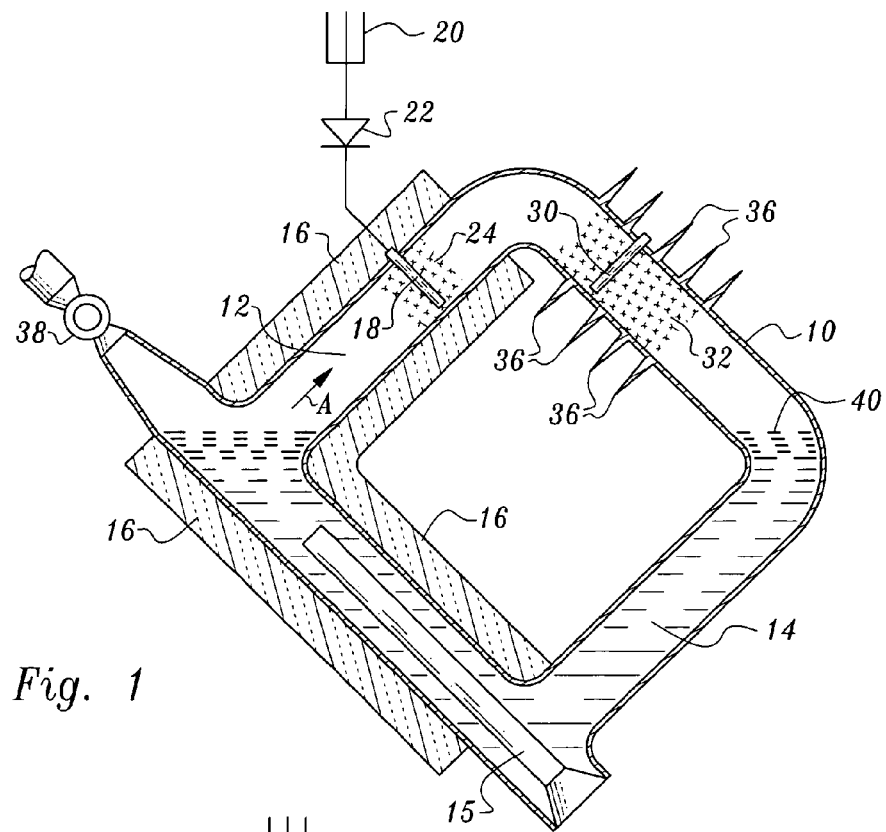
FIG. 1 is a somewhat schematic representation of a first embodiment of the invention.

Referring now to FIG. 1, a preferred form of apparatus constructed in accordance with the teachings of the present invention is illustrated. The apparatus is in the form of a closed loop electrical generator including a container 10 having a rectangular configuration. The loop or container is disposed vertically and tipped sideways at about a forty five degree angle, as shown, by any suitable support structure, such as a tower (not shown).

The loop or container 10 is constructed of a non-metallic material such as glass, ceramic, or plastic. The container includes a continuous passageway 12 extending the entire length of the loop.

Located within the passageway 12 is a liquid 14 which may be any suitable aqueous or low boiling hydrocarbon liquid which, upon heating thereof, will produce a vapor. Disposed in passageway 12 is a conventional electric heating cartridge 15, which is merely representative of the types of heat sources which may be employed to produce a vapor. The produced vapor will transport in the direction indicated by the arrow A from the top surface of the liquid to electron supply structure operatively associated with the container for adding electrons to electrons pre-existing in the vapor. To eliminate heat loss, the container or loop is covered by suitable insulating material 16 between the heater location and the electron supply structure.

The electron supply structure includes an electron feeding electrode 18, an antenna 20 and a diode 22 disposed between the electron feeding electrode and the antenna. The antenna can be of any suitable type such as a whip, disk, screen or net. The combination of an antenna with a diode per se is known, such technology being utilized to pick up radio and TV signals for example and collect the electrical energy thereof. The electron supply structure additionally includes foraminous, electrically conductive structure in the form of a copper or other metallic gauze or mesh 24 in the passageway, allowing for the passage of the vapor therethrough. The gauze is electrically connected to the electron feeding electrode 18.

The electron bearing vapor then passes from the location of the gauze 24 to the location of the electron collecting structure downstream from the electron supply structure. The electron collecting structure is for the purpose of collecting electrons from the vapor during continued transport in the passageway.

The electron collecting structure includes an electron collecting electrode 30 and foraminous, electrically conductive structure in the form of metallic gauze or mesh 32, in this instance, in the passageway, allowing for the passage of vapor therethrough while collecting electrons therefrom. The gauze 32 is electrically connected to the electron collecting electrode 30. Any electrical device placed between electrode 30 and a ground can become operational, of course depending upon the amount of electrical output. The release of the electrons onto gauze 32 results from the vapor at such location returning to its liquid state. Cooling of the vapor will cause such condensation. In the arrangement illustrated, cooling of the vapor resulting in condensation is effected by cooling fins 36 arrayed about the container and projecting therefrom in the vicinity of the electron collecting structure.

The spread of the operating temperatures from liquid to vapor and vapor back to liquid can be lowered by reducing the system's pressure. This may be adjusted by use of valve 38. Valve 38 may also be utilized to provide access for filling the loop with liquid to its desired level 40. Once filled to level 40, no additional liquid is required for continual operation. In other words, the apparatus illustrated acts as a closed system continuously using over and over again the same liquid in the passageway.

Figure 2:
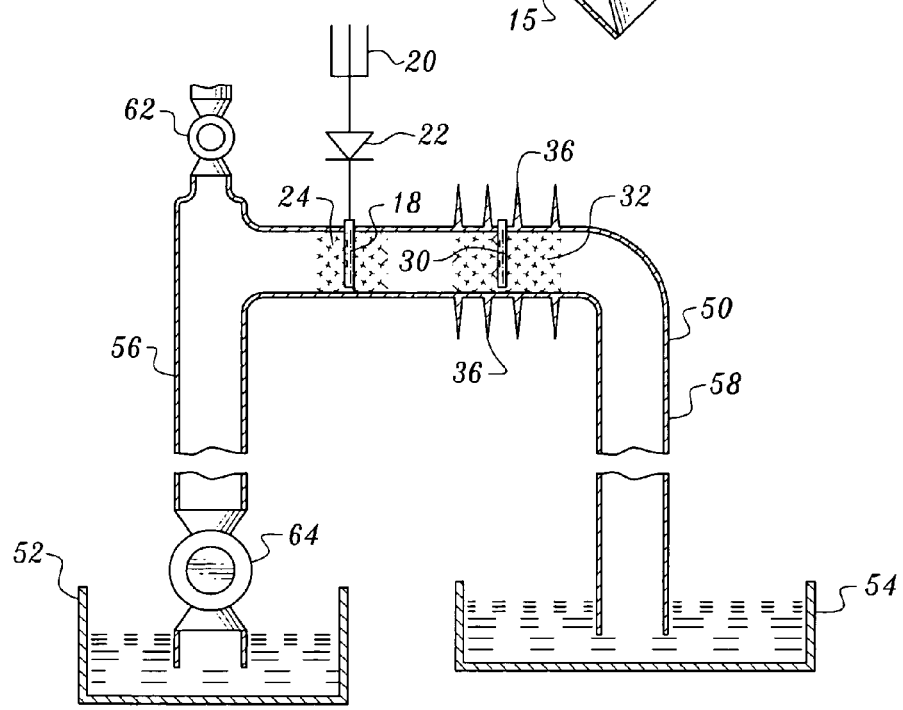
FIG. 2 is a somewhat schematic representation of a second embodiment of the invention.

FIG. 2 illustrates an alternative arrangement wherein the container incorporates a passageway defined by a vertical, inverted "U" tube 50 exploiting the conversion of vapor to liquid by condensation to produce electrical energy. The device may be built on a tower or supported by non-conducting cables. The open ends of the tube 50 are disposed in reservoirs 52, 54, reservoir 52 being of the nature of a waste heat vessel while reservoir 54 contains liquid at a lower temperature due to the heat given up by the condensing vapors. Container 50 has a vertical riser tube or leg 56 which is of such a length as to operate under reduced pressure with a tepid liquid. The leg is painted black if utilizing solar heating to heat the liquid. Leg 58 is the down-comer of a length similar to riser tube 56. Leg 58 may be painted white if solar heating is employed. Both legs 56, 58 are of non-metallic material, such as plastic, ceramic or glass, as is the upper tube segment 60 interconnecting the tops of the legs.

Electron feeding electrode 18 is connected to metallic, electrically conductive gauze or mesh 24 through which the vapors produced in leg 56 pass. The electrode 18 is connected to antenna 20 and diode 22 if additional electrons are required.

These electron laden vapors then pass to the electron collecting electrode 30, passing through metallic gauze 32 electrically connected to electrode 30. At this location, the electron laden vapors are condensed back to a liquid, utilizing cooling fins 36, thus yielding their electric energy to electrode 30. A valve 62 is connected to a suitable vacuum source (not shown) which pulls the liquid levels up in legs 56, 58 high enough to create a space for the vapors produced to travel. A valve 64 at the lower end of leg 56 may be employed as a manual shut down if the temperature within leg 54 is insufficient to produce vapors.

Figure 3:
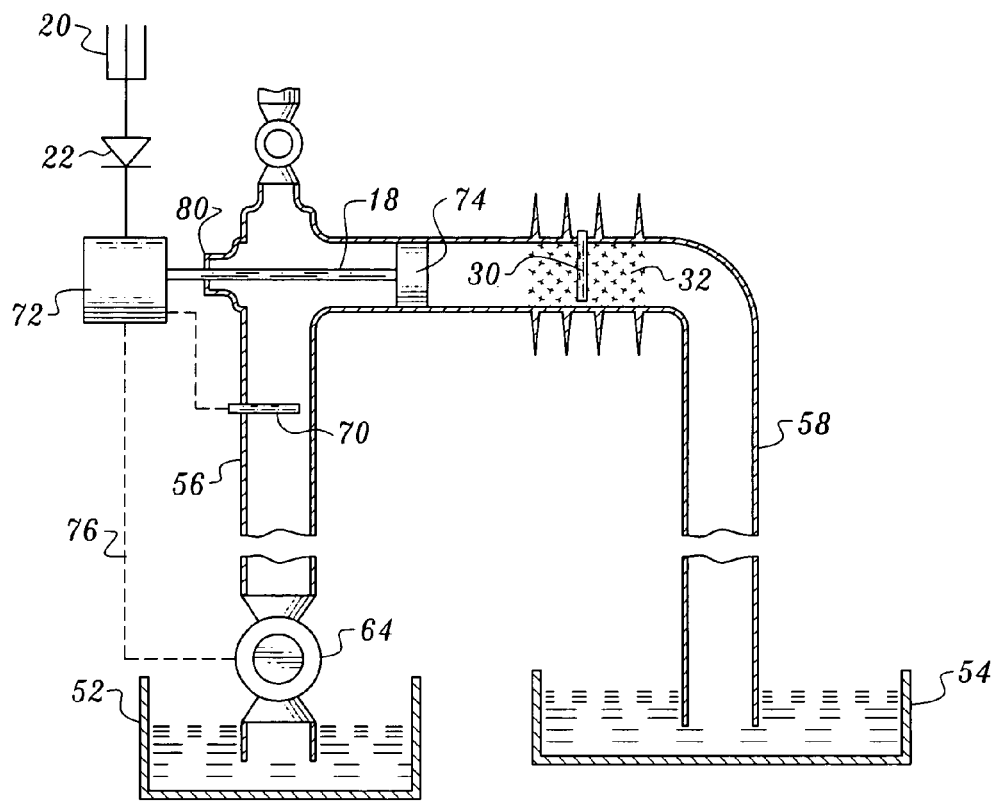
FIG. 3 is a somewhat schematic representation of a third embodiment of the invention.

FIG. 3 shows an arrangement similar to that illustrated in FIG. 2 except that it employs an approach for moving an electron feeding electrode to vary the separation thereof relative to electron collecting electrode 30 and metallic gauze or mesh 32. Separation will decrease the possibility of internal sparking. In this arrangement, the temperature of the liquid in riser leg 56 is sensed by a temperature sensing probe 70 which sends this information to transducer 72. Transducer 72 then pushes or pulls electron feeding electrode 18 and its attached foraminous member in the nature of an apertured disk of stainless steel or screen 74 to provide a controlled separation relative to electron connecting electrode 30. The transducer also positions valve 64 to operate at optimum opening linked by linkage 76 which may be any suitable mechanical, electrical or pneumatic linkage. A packing gland 80 acts as a seal. In all other respects, the arrangement of FIG. 3 is essentially the same as that shown in FIG. 2.

Figure 4:
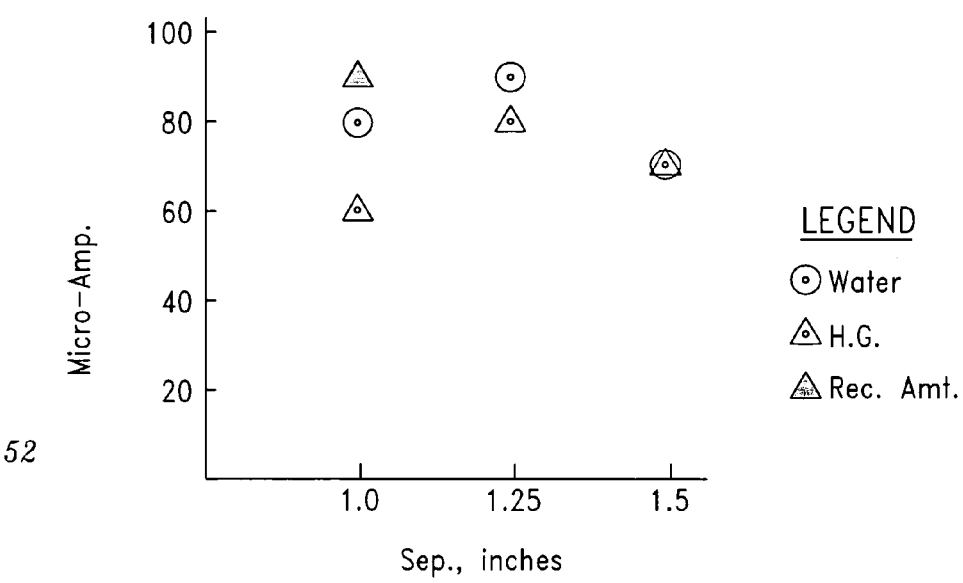
FIG. 4 is a plot of test results illustrating electrode separation in inches versus the current generated.

FIG. 4 is a plot of test results made to determine electrode separation in inches versus the current generated. Both aqueous or low boiling hydrocarbons were used as the liquid of atmospheric pressure. The vapors produced by a boiler passed through a one eighth inch OD tube as the electron heating electrode. Various separations of the electron feeding and electron collecting electrodes were measured. The electron collecting electrode was an ice chilled copper gauze. This system yielded measurable electric current. Adding an antenna and rectifier diode resulted in a notable increase of the current produced.

The invention claimed is:

1. Apparatus for generating electrical energy comprising, in combination:
    a container containing liquid heated to a sufficient degree to produce a vapor, the container including a passageway in which said vapor is transported;
    electron collecting structure operatively associated with said container for collecting electrons produced by cooling of said vapor and changing of said vapor back to a liquid phase during transport of said vapor in said passageway; and
    electron supply structure operatively associated with said container for adding electrons to electrons preexisting in said vapor during transport thereof in said passageway, said electron supply structure including an electron feeding electrode, an antenna receiving ambient electrical energy, and foraminous, electrically conductive structure in the interior of the passageway, said vapor passing through said foraminous, electrically conductive structure, said foraminous, electrically conductive structure being electrically connected to said electron feeding electrode whereby electrons from said electron feeding electrode are deposited on said vapor by said foraminous, electrically conductive structure.

2. The apparatus according to claim 1 wherein said foraminous, electrically conductive structure comprises electrically conductive gauze.

3. The apparatus according to claim 1 additionally comprising adjustment structure for selectively moving said foraminous, electrically conductive structure to change spacing between said foraminous, electrically conductive structure and said electron collecting structure.

4. The apparatus according to claim 1 wherein said electron collecting structure includes an electron collecting electrode and foraminous, electrically conductive structure in the passageway spaced from the foraminous, electrically conductive structure of said electron supply structure allowing for the passage of vapor therethrough while collecting electrons therefrom and electrically connected to said electron collecting electrode.

5. The apparatus according to claim 1 additionally comprising cooling structure for condensing said vapor back to a liquid at or adjacent to the location of said electron collecting structure.

6. The apparatus according to claim 1 additionally comprising a heater operatively associated with said container for heating said liquid to produce said vapor.

7. The apparatus according to claim 6 wherein said heater is in said passageway, said container includes insulation surrounding said passageway between said heater and said electron supply structure.

* * * * *